United States Patent [19]

Cook et al.

[11] 4,319,174

[45] Mar. 9, 1982

[54] STEPPER MOTOR DRIVE SYSTEM

[75] Inventors: Paul A. Cook, Lexington; Randall D. Mayo, Georgetown; Jerry W. Raider, Lexington, all of Ky.

[73] Assignee: International Business Machines Corporation, New York, N.Y.

[21] Appl. No.: 136,002

[22] Filed: Mar. 31, 1980

[51] Int. Cl.³ .................................. G05B 19/40
[52] U.S. Cl. ........................ 318/696; 318/432
[58] Field of Search ........... 318/696, 685, 599, 341, 318/432

[56] References Cited

U.S. PATENT DOCUMENTS

| | | | |
|---|---|---|---|
| 3,748,554 | 7/1973 | McDonald | 318/696 |
| 3,750,000 | 7/1973 | Bruckner et al. | 318/685 |
| 3,965,406 | 6/1976 | Yablonski | 318/696 |
| 4,035,708 | 7/1977 | Schaff | 318/696 |
| 4,091,316 | 3/1978 | Friedman | 318/696 |
| 4,140,955 | 2/1979 | Drabing | 318/696 |
| 4,255,693 | 3/1981 | Keidl | 318/696 |

OTHER PUBLICATIONS

Hughes et al., "Magnetic Damping in Stepping Motors," Proc. IEEE, vol. 122, No. 8, Aug. 1975, pp. 819-824.

Primary Examiner—J. V. Truhe
Assistant Examiner—Eugene S. Indyk
Attorney, Agent, or Firm—John A. Brady

[57] ABSTRACT

A stepper motor damping control system. Damping is performed by switching the power supply connection(s) of energized motor phase windings alternatively ON and OFF at a predetermined relatively high fixed rate. Said switching is performed using a clock signal information for switching one way and an information denoting equality between a voltage substantially proportional to the current flowing through said motor phase windings with a predetermined sawtooth sloped reference signal synchronized with said clock signal for switching the other way.

20 Claims, 7 Drawing Figures

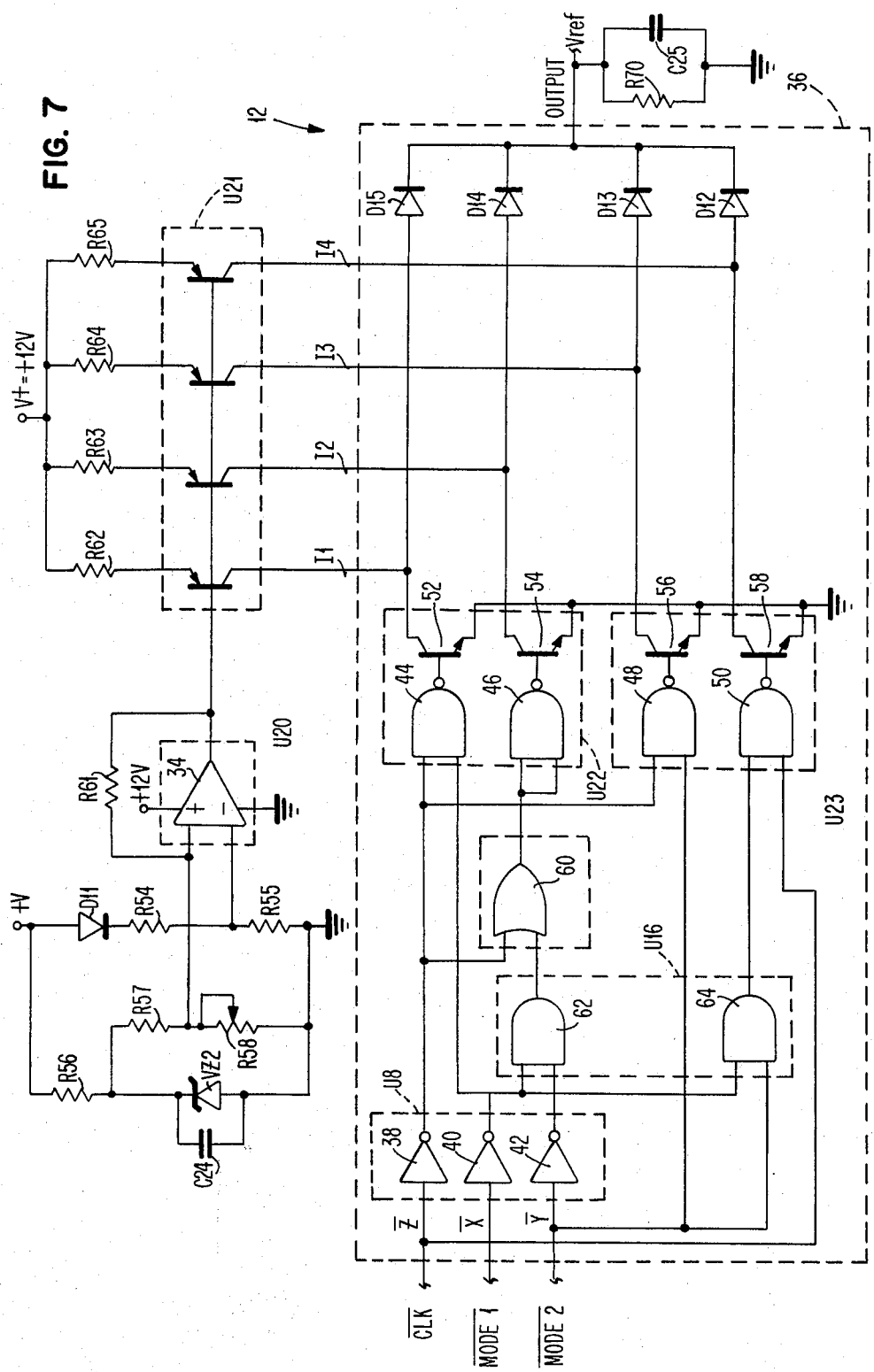

STEPPER MOTOR DRIVE SYSTEM

BACKGROUND OF THE INVENTION

This invention relates to stepper motor driving systems and more particularly to means for damping a stepper motor by controlling its driving current.

Most stepper motors have a salient pole stator structure carrying a number of windings, one to each pole with oppositely located windings being generally connected together into one single motor phase winding, whilst rotors fall into two categories: the so called permanent magnet and variable reluctance categories. Driving is performed in both categories by controlling the application of current to predetermined motor phase windings with predetermined sets of binary valued signals. In other words, the motor is driven by energizing the motor phase windings in an order and at specific times determined by the motor characteristics and the specific motor move desired.

Stepper motors are normally used for driving mechanical loads requiring fast and precise positionings repeated at a relatively high rate. However, when a stepper motor stops, it oscillates about its rest position until these oscillations decrease, due to inherent damping, and finally stop. If it is desired to stop in some position within some tolerance band before taking any further action regarding the system load, and the oscillations are larger than the tolerance band, then the system is delayed until the oscillation amplitude reaches an acceptable level. A damping ratio of the order of 0.01 is typical for conventional stepper motors presently available. Such an inherent damping is by itself inadequate for high speed operation of the stepper motor driven system.

Another drawback of the stepper motor driven system is also connected to the oscillations mentioned above and occurs when a series of motor moves are made with a relatively short time between moves. In this case, the oscillations continue through the whole series of moves and can build up to the point that the motor loses synchronism (break phase). This phenomenon is particularly severe since the motor will not end up in the desired position. This is obviously most detrimental for open-loop type of configurations where no feedback is used for correcting the motor positioning based on actual position. With open-loop configurations, any phase breaking is carried on subsequently and results in false subsequent load positionings without any special means for detecting the erroneous positionings being provided.

Means have been provided for increasing the motor damping under control. The most common method for increasing said motor damping calls for the use of additional stator resistances. The use of resistance leads to energy dissipation which should be avoided, if possible, for obvious reasons such as heating effects and inefficient operation.

Other purely electronic solutions have been disclosed, which are based on the so called "retrotorque" principle in which damping is performed by applying brief pulses to phases just previously energized. Even though these methods eliminate the need for a damping resistor, they require fairly elaborate electronic equipment and most of all do not provide means for conveniently controlling the inherent damping. That is, the damping which would be observed for simple oscillation about rest position.

Other methods have also been provided for eliminating the damping resistor.

U.S. Pat. No. 4,140,955 to R. B. Drabing is one of these. This patent calls for an electronic system wherein a driving circuit is provided which produces an excitation cycle wherein each field winding is first excited with a relatively high, constant DC voltage causing an increase in current. Thereafter, the high voltage across each field winding is pulse modulated with a duty cycle proportional to the ratio of the desired operating voltage to the voltage of the power source. This system operates like a dual power-supply stepping motor without any need for a second distinct power supply element. No improvement on inherent damping is achieved.

U.S. Pat. No. 4,035,708 to U. Schaff calls for means for reducing the power loss of a stepping motor when said motor is at standstill by lowering the winding current from its nominal value to a substantially lower holding value when the motor is stopped. The current is turned on and off during normal operation. The phase current sensed value is used to trigger a trigger circuit which in turn controls ON-OFF turning of the power supply driving the motor. This patent addresses only power saving problems.

Application Ser. No. 57,777, filed July 16, 1979, entitled "Electronic Damping Of Stepper Motor" and assigned to the assignee of this invention, calls for an electronic damping process based on current chopping with a reference voltage varying in accordance with the motor speed. This system requires the use of a transducer and in addition does not call for relatively inexpensive and yet reliable means for making the damping ratio easily adjustable to the actual motor operating mode.

SUMMARY OF THE INVENTION

An object of the invention is to provide a non-dissipative damping system for a stepper motor.

Another object of the invention is to provide a dynamically adjustable damping system for a stepper motor.

Yet another object of this invention is to provide a damping system for a stepper motor wherein damping is programmably controllable and adjustable to the motor operating mode. According to the present invention, dynamically adjustable and controllable damping is performed by chopping the current flowing into energized phase windings at a clock controlled rate and a dynamically adjusted duration based on detection of the equality in amplitude of a sense signal information derived from the current flowing through motor phase windings, with a reference signal generated in predetermined phase and frequency relationship with the clock signal. The technique is programmable for controlling damping through a control of the slope of the reference signal.

A fuller understanding of the nature and advantages of the invention will derive from the following detailed description in conjunction with the accompanying drawings.

BRIEF DESCRIPTION OF THE DRAWINGS

FIG. 7 is a reference signal generator for FIG. 1.

DETAILED DESCRIPTION OF THE INVENTION

Figure 1:
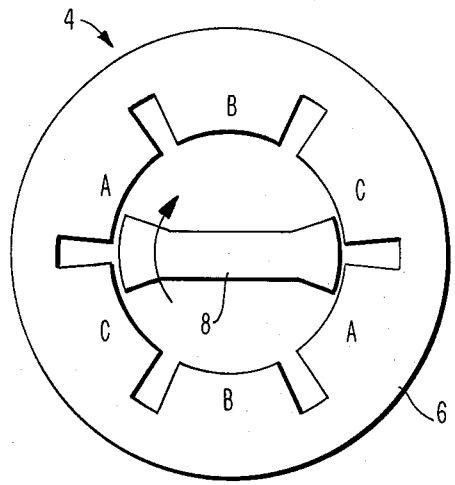
FIG. 1 is a simplified diagram of a 3-phase stepper motor.

A simplified diagram of a three-phase stepper motor 4 is shown in FIG. 1. Opposite poles of the stator 6 are designated by the same letter A, B, or C to indicate that the windings (not represented) on opposite poles are connected together into one set for providing one motor phase winding. The phase windings will therefore be designated A, B and C accordingly. The motor is operated by connecting the motor phase windings A, B and C to a D.C. power supply (not shown) according to a predetermined sequence and thus by energizing selected phase windings A, B or C. The motor rotor 8 is shown in the equilibrium position, with phase windings A and C energized. As the rotor 8 overshoots and lines up more and more with phase A, the flux linkage in the winding on poles A increases and generates a positive back e.m.f. This positive back e.m.f. produces a change in phase current which generates a torque. A similar analysis shows that the phase winding C experiences a negative back e.m.f. and a corresponding torque. The combination of these two torques produces a retarding (damping) torque, that might be considered as being due to an inherent damping. Now, if the current in the energized phase windings is chopped by switching the connections between said phase windings and the D.C. power supply (not shown) which feeds these phase windings, ON and OFF alternatively, one may control the damping phenomenon by controlling the magnitude of the current produced by the ON/OFF switching. In addition, an arrangement for controlling dynamically and for adjusting properly this ON/OFF switching of said D.C. power supply (not shown) to said phase windings would make it possible to control the damping at will. This result will be achieved by providing an external means for controlling the chopping phenomenon mentioned above. As will be explained further on in detail, the external means referred to is a properly selected adjustable and programmable voltage reference signal source cooperating with a conveniently selected clock signal and means for sensing current in energized phase windings for dynamically controlling the damping phenomenon.

Figure 2:
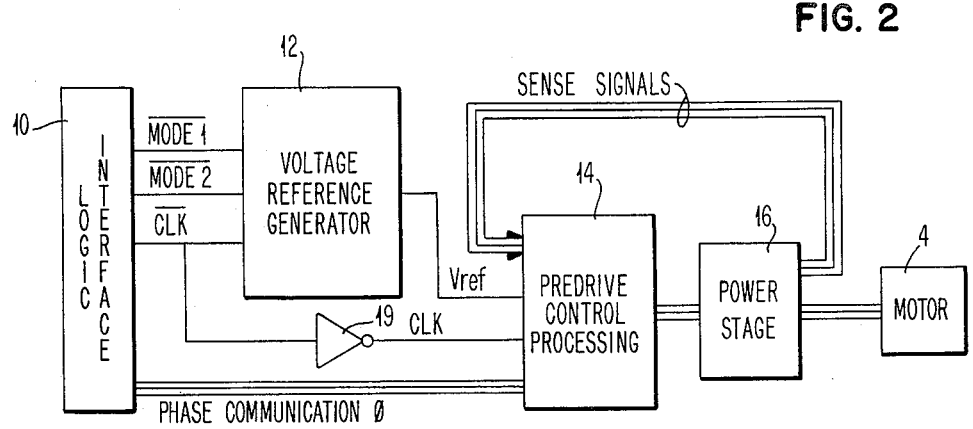
FIG. 2 is a block diagram of a system according to the invention.

Shown in FIG. 2 is an arrangement of the overall system for controlling the above mentioned chopping phenomenon according to the invention. A logic interface 10 provides Mode 1, Mode 2, inverse clock signal $\overline{CLK}$ and phase commutation information ($\phi$). Mode 1, Mode 2 and $\overline{CLK}$, signal informations are applied to the voltage reference generator 12 which in turn delivers the reference signal Vref to a predrive control processing circuit 14. The predrive control processing circuit 14 drives a power stage 16 which in turn drives the motor 4. Three lines are represented which connect the predrive control processing circuit 14 to the power stage 16 and the latter to the motor 4, one for each winding A, B and C (not shown). Three lines are also available at the output of the logic interface 10 for providing the phase commutation information $\phi$. These three lines are connected to the input of the predrive control processing circuit 14 through which is derived the conventional logic information defining when a motor phase winding A, B or C (not shown) should normally be fed to perform the specific motor move. The predrive control processing circuit 14 also receives on its inputs the clock information CLK obtained by inverting the $\overline{CLK}$ signal, available at the logic interface 10 output, into an inverter 19, and three sense signals fed back from the power stage 16. The logic interface 10 is merely a connection board for connecting the circuit arrangement of FIG. 1 to conventional phase, clock and mode control generators (not represented). In other words, the logic information $\phi$ defining, for a specific motor move operation, which predetermined motor phase windings should be energized, and when, is conventionally provided from an external control source (e.g., a microprocessor not shown) to the logic interface 10 and from there to the phase commutation lines. The inverse clock signal $\overline{CLK}$ and the two logic mode information signals (i.e., Mode 1 and Mode 2) also provided to the logic interface 10 by said external control source, will be defined further on.

Conventionally, the motor 4 phase windings A, B and C (not shown) would be energized by the power stage 16 according to sequences determined by the logic information on phase commutation $\phi$ lines, based on the speed and acceleration profiles to be achieved by the motor 4. In addition, damping operation is provided by chopping the current applied to motor 4 phase windings. The chopping function is achieved by the predrive control processing 14 acting upon the power stage 16. The damping is kept dynamically related to the actual operation of the stepper motor 4 by controlling the operation of predrive control processing 14 using feedback sense signals representative of currents provided by the power stage 16 to the motor 4. In addition, said predrive control processing 14 operation is also controlled using the reference signal Vref generated by the voltage reference generator 12 in combination with the clock information CLK. As will be explained later on, after the elements of FIG. 2 will have been described in detail, a proper selection of the voltage reference Vref in combination with the clock information CLK emphasizes the damping phenomenon looked for and makes it controllable. The voltage reference generator 12 is designed for providing a programmable reference signal Vref for externally controlling the damping phenomenon in accordance with the operating mode of motor 4. However, in order to make the invention more easily understandable, the details of the elements 10, 12, 14 and 16 of FIG. 2 will now be described.

Figure 3:
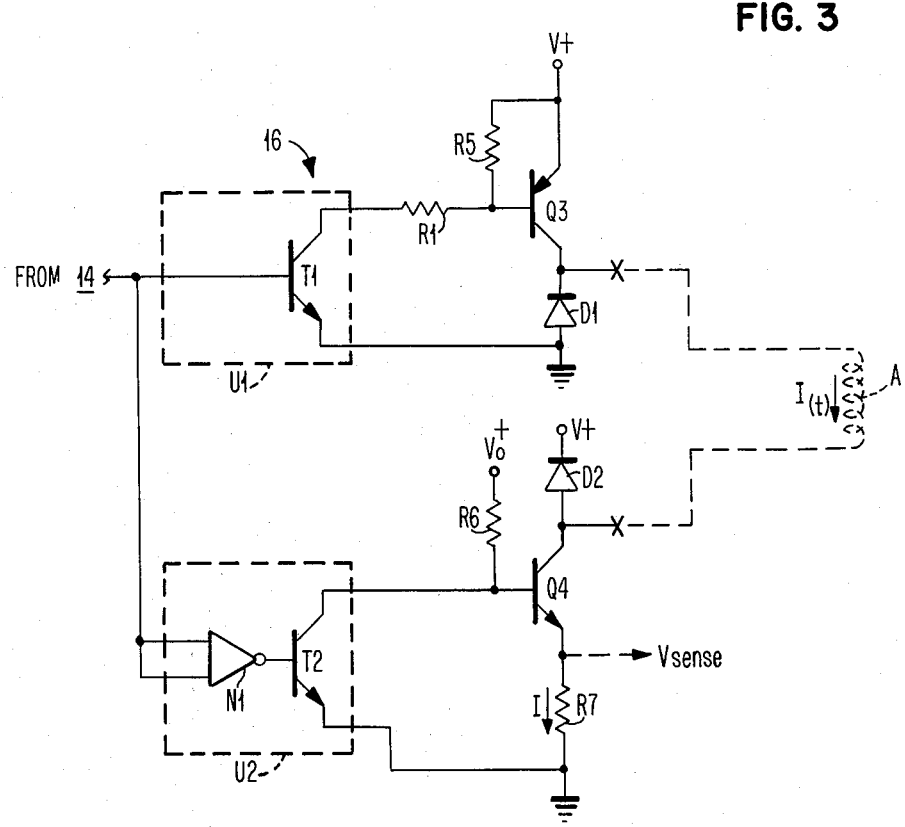
FIG. 3 is a section of a power stage for FIG. 1.

Referring to FIG. 3, a section of the power stage 16 is represented. This section shows the elements of the power stage 16 to be used for driving one phase winding (A) of the 3-phase stepper motor 4 and therefore should be triplicated for driving the complete motor 4. In other words, the circuits (not represented) used in connection with the motor for driving the remaining phase windings (not represented) are identical to those associated with the motor 4 phase winding A. The motor 4 phase winding A is driven by a circuit designed into a bridge configuration and including a PNP transistor Q3 (which could conveniently be replaced by a Darlington circuit) with its emitter electrode connected to a power supply V+ (e.g., +32 volts) and its collector electrode connected to ground through a diode D1. One end of the motor 4 phase winding A is connected to the collector electrode of transistor Q3. A resistor R5 is connected between emitter and base electrodes of Q3. The other portion of the bridge configuration is made of a NPN transistor Q4 having a collector electrode connected to the power supply V+ through a diode D2, and an emitter electrode connected to ground through a resistor R7. The base electrode of transistor Q4 is connected to another power supply Vo+ (e.g., +5 volts) through a resistor R6 providing base drive current for transistor Q4. Transistor Q4 could also be replaced by a darlington circuit. The second end of the motor 18 phase winding A is connected to the collector electrode of the NPN transistor Q4.

The rotor 8 (see FIG. 1) of the motor 4 is conventionally made to rotate by controlling the sequence according to which the phase windings A, B, or C are being fed. Phase A, for instance, is being fed by turning transistors Q3 and Q4 on, into saturation. The ON-OFF switching of transistors Q3 and Q4 is in turn controlled through two driver modules, U1 and U2. Each of these two driver modules U1 and U2 has two outputs. One output of driver module U1 is connected to the base electrode of PNP transistor Q3 through a resistor R1, the other output is connected to ground. One output of driver module U2 is connected to the base electrode of NPN transistor Q4, the other output is connected to ground. The module U1 comprises essentially a NPN transistor T1 having its collector electrode connected to the base electrode of transistor Q3 through resistor R1, and its emitter electrode connected to ground. The base electrode of transistor T1 is connected to the output of AND gate 32. The U2 module is essentially made of a NPN transistor T2 having its collector electrode connected to the base electrode of transistor Q4 and its emitter electrode connected to ground. The base electrode of transistor T2 is connected to the output of AND gate 32 of the predrive control processing circuit 14 through an inverter N1. Consequently, the feeding of phase winding A is being controlled through an information applied on U1 and U2 from the predrive control processing circuit 14.

Figure 4:
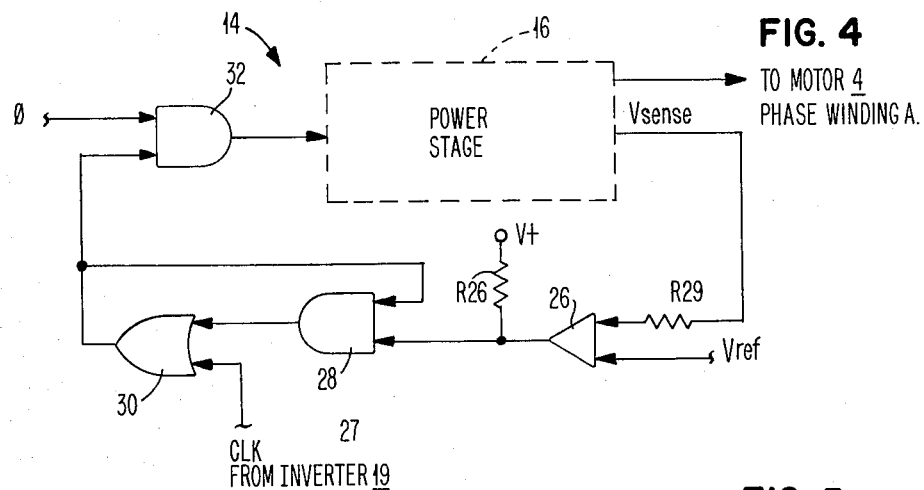
FIG. 4 is a section of a predrive control processing circuit for FIG. 1.

Referring now to FIG. 4, a section of the predrive control processing circuit 14 is represented. For the same reasons as those mentioned above, this section is associated with one of the motor 4 phase windings (i.e., phase winding A) and therefore the circuit to be described hereunder in connection with FIG. 3 is triplicated to cover the needs of the whole 3-phase motor 4. The emitter electrode of NPN transistor Q4 of FIG. 2 is connected to one input of a voltage comparator 26 through a resistor R29. The voltage drop across resistor R7 of FIG. 2 designated by Vsense provides a means for sensing the current flowing through the motor 4 phase winding A. The second input of the voltage comparator 26 is connected to the output of the voltage reference generator 12, providing the reference signal Vref. A resistor R26 is connected between the power supply V+ and the output of voltage comparator 26. The same output is also connected to the input of a latch 27 made of an AND gate 28 and an OR (logic circuit) 30, with the output of AND gate 28 connected to one input of OR logic circuit 30 and the output of OR logic circuit 30 being fed back into one input of AND gate 28. A second input of OR logic circuit 30 is connected to the output of inverter 19. The output of OR logic circuit 30 is connected to one input of an AND gate 32 the second input of which is connected to one of the output pins of the logic interface 10 providing the so called phase commutation information ($\phi$).

A logic up-level from AND gate 32 brings the open collector outputs of transistors T1 low and T2 high (see FIG. 3). Transistors (or darlington power transistors) Q3 and Q4, are thus turned on into saturation. This provides a current path from the V+ d.c. power supply through transistor Q3, the motor 18 phase winding A, transistor Q4, and resistor R7 to ground.

In operation, for an energized phase winding A the phase information $\phi$ is conventionally set at an up level. When the clock signal CLK goes up, the output of latch 27 goes up and remains up even though the clock signal goes down. The gate 32 is made to open to the phase information $\phi$. This turns the transistor Q3 and Q4 (see FIG. 3) to saturation, connecting the phase winding A between the d.c. power supply V+ and ground. The phase winding A is energized and the current I flowing through R7 goes up. This situation remains unchanged until the voltage Vsense representative of the current I flowing through phase winding A, equals the voltage of reference signal Vref, by which time the output of comparator 26 forces the latch 27 to switch to a low output, thus closing gate 32. The phase winding A is de-energized by switching transistor Q3 and Q4 off. The current I starts dropping until a new up level of clock signal CLK occurs and the phenomenon just described starts again. The phase current I is thus chopped by switching the transistors Q3 and Q4 ON when the clock signal CLK goes up, and switching same transistors OFF based on the occurrence of the equality in amplitude information denoting that Vref=Vsense.

Initial phase current $I_{(t)}$ flowing through motor 4 phase winding A (see FIG. 2) is primarily a function of motor 4 phase winding A characteristics, i.e., inductance L and resistance R.

$$I_{(t)} \approx V/R \ [1 - e^{-t/\tau}]$$

with $\tau = L/R$, being the time constant of motor 4 phase winding A. For the motor 4 being used, $\tau$ is approximately 2 to 10 milliseconds. The clock CLK frequency is selected accordingly, as explained later on.

Figure 5:
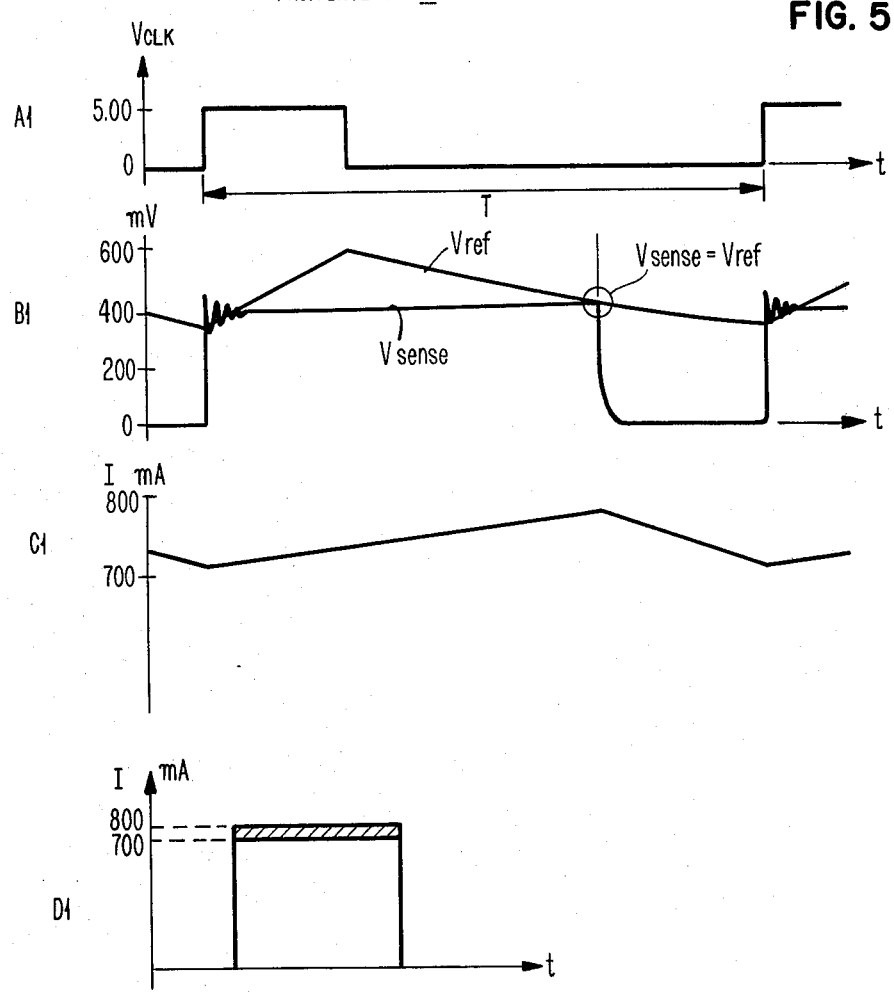
FIG. 5 is a time diagram according to the invention.

As phase current $I_{(t)}$ increases, the voltage across R7 (Vsense) increases until it reaches the level of the voltage (Vref) of the reference signal. At this point an equality information is provided by the voltage comparator 26 (see FIG. 4), and current chopping begins. The phase commutation signal $\phi$ from AND gate 32 to the power stage 16 is interrupted and the transistors Q3 and Q4 are turned off. During this part of the cycle, some of the energy present in the field of the motor 4 phase winding A is returned to the V+ d.c. source via current flow through the now forward biased diodes D1 and D2. When transistor Q4 switches off, the voltage Vsense drops to zero, returning the output of the voltage comparator 26 to an up level. The next clock pulse restores the up level output of AND gate 32. The phase current path from V+ to ground through transistor Q3, motor phase winding A, transistor Q4 and resistor R7 is again turned ON until the Vsense voltage increases to equal the voltage Vref of the reference signal. This cycle is repeated at a rate defined by the clock CLK frequency (i.e., 20 KHz) for the phase commutation period, i.e., for the period of time the particular motor 4 phase winding A should be energized for the specific motor 4 move desired. Referring to FIG. 5, a time diagram is represented. Diagram A1 represents the clock signal CLK voltage versus time, varying at a relatively high rate of: F=20 KHz. The clock frequency F should be selected above 15 KHz to avoid any acoustical problems. Also, an upper limit of the clock frequency F is given by the switching rate limits of transistors Q3 and Q4 of FIG. 3, which is about 50 KHz. A 20 KHz frequency is therefore, presently a convenient value for the clock CLK frequency. For best operation of the chopping process, $T=1/F=50\mu s$ should be substantially smaller than $\tau$ (e.g., 40 times smaller). Also, for proper operation of the damping process, T should be substantially smaller than the period of the natural frequency of oscillation of the mechanical system about a rest position. Diagram B1 shows the two signals to be compared into voltage comparator 26 (FIG. 3), i.e., Vref and Vsense. The voltage Vref should be in predetermined phase and frequency relationship (eg., synchronized) with the clock signal CLK. The frequency ratio between the reference signal Vref and the clock signal CLK has been selected to equal one, but it could be defined at a different integer value as well. The information Vref=Vsense taken into consideration for switching the transistors Q3 and Q4 from one state of conduction (eg., ON) to the other (eg., OFF) is better being selected such that Vref and Vsense intersect each other over oppositely sloped variations. Diagram C1 shows the variations of the current $I_{(t)}$ flowing through the motor 4 phase winding A. Diagram D1 shows the same current $I_{(t)}$ with time and amplitude scales different from those used for Diagram C1. The area where the variations represented on Diagram C1 occur is represented by a dashed area. For proper operation of the system, the ripple factor, i.e., amplitude of the dashed area versus amplitude of current I (see FIG. D1) should be about 10%.

As already mentioned in describing FIG. 1, the motor rotor 8 is shown in the equilibrium position, with phase windings A and C energized. As the rotor 36 overshoots and lines up more and more with phase A, the flux linkage $\lambda$ of the windings of phase winding A increases and generates a positive back e.m.f. in each winding according to the equation:

$$V_{EMF}=d\lambda/dt$$

Figure 6:
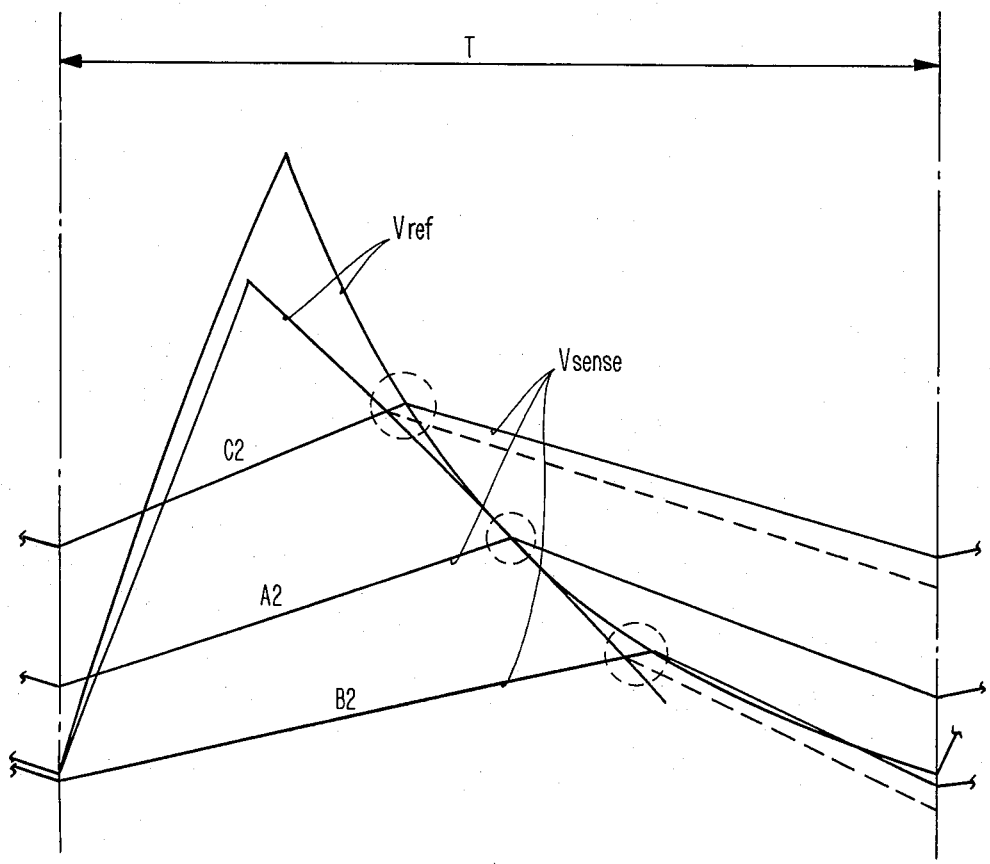
FIG. 6 is a time diagram according to the invention.

This positive back e.m.f. produces a decrease in slope of the sensed current waveform which interacts with the sloped reference signal waveform to decrease the current in phase winding A. A similar analysis shows that phase winding C experiences a negative back e.m.f. and a corresponding increase in current and torque. The combination of these two torques produces the retarding torque in addition to the torque which would be normally present at that position with zero velocity. That is, this phenomenon produces a torque which is directly but non-linearly related to velocity and is in a direction to oppose that velocity. This shows the advantages of a sloped reference signal voltage Vref (see FIG. 6). Damping torques can be preadjusted and controlled very conveniently through predetermined adjustments of the slopes of the reference signal Vref. The damping phenomenon can be accentuated by the use of an exponentially decaying reference signal (Vref) waveform because the same changes in back e.m.f. produce a larger increase in current than for a constant slope for negative back e.m.f., while it produces a smaller decrease in current for a positive back e.m.f.

Referring again to FIG. 6, both constant and exponentially decaying sloped waveforms of Vref are represented. Interaction of these reference signals with currents in the corresponding motor phase windings for zero (A2), positive (B2) and negative (C2) back e.m.f.'s are also represented. In addition, exponentially varying reference signal waveforms are not only more appropriate for performing the desired function looked for, they are also more convenient to generate as will be shown by referring to FIG. 7 representing a diagram of the reference signal (Vref) generator 12 for several motor 4 operating modes. Four selectable operating modes have been defined, which are respectively designated by, run, damp, detent and spare. The four reference signals for all these operating modes are generated by the switching of combinations of four precision current sources through a common R-C (resistor-capacitance network R70-C25). The four precision currents, designated by I1, I2, I3 and I4 are provided by a module U21 made of four PNP transistors having their emitter electrodes connected to a +12 volts power supply through individual resistors R62, R63, R64 and R65. The same PNP transistors have their base electrodes connected to a common voltage source made of module U20 and associated circuitry. The module U20 comprises a differential amplifier 34 connected to a +12 volts power supply. The differential amplifier 34 has its inverting input connected to a voltage divider made of resistor R57 and potentiometer R58 for adjustment to component variations. A zener diode VZ2 in parallel with a capacitor C24 is connected across said voltage divider. One end of the voltage divider, is connected to ground, the other end is connected to the +12 V power supply through a resistor R56. The +12 V power supply is also connected to ground through a series circuit including diode D11, (for temperature compensation purposes) and resistors R54, R55. The non-inverting input of differential amplifier 34 is connected to the point common to resistors R54 and R55. A feedback resistor R61 is connected between the output of differential amplifier 34 and its inverting input.

The four reference signals are generated by combining the currents I1, I2, I3 and I4 into the R-C circuit comprising capacitor C25 and resistor R70 mounted in parallel between ground and output of the reference generator 12. The combination between I1, I2, I3 and I4 is controlled by a logic selection circuit 36. The latter is provided with three inputs respectively connected to the $\overline{CLK}$, mode 1 and mode 2 outputs of logic interface 10. The $\overline{CLK}$ information is fed into one input of a NAND logic circuit 44 through an inverter 38. The mode 1 information is fed into NAND circuit 44 through an inverter 40. The output of same inverter 40 is also connected to inputs of AND circuits 62 and 64. The second input of AND circuit 62 is connected to the mode 2 output of logic interface 10, through an inverter 42. The output of AND circuit 62 is connected to one input of an OR circuit 60, the second input of which is connected to the output of inverter 38. The output of OR circuit 60 is connected to the input of an inverter 46 (a NAND circuit with shorted inputs). The input of inverter 42 is connected to one input of a NAND circuit 48 the second input of which is connected to the output of inverter 38. The input of inverter 42 is also connected to an AND circuit 64 the second input of which is connected to the output of inverter 40. The output of AND circuit 64 is connected to an input of a NAND circuit 50, the second input of which is connected to the input of inverter 38. The outputs of NAND circuits 44, 46, 48 and 50 are connected to the base electrodes of NPN transistors 52, 54, 56 and 58 respectively. The emitter electrodes of same transistors 52, 54, 56 and 58 are connected to ground, while their collector electrodes are connected to the output of the voltage reference generator 12 through diodes D15, D14, D13 and D12 respectively.

The four PNP transistors of module U21 have their collector electrodes connected to the collector electrodes of NPN transistors 52, 54, 56 and 58 respectively. For convenience purposes, the various circuits mentioned above have been grouped into modules, with inverters 38, 40 and 42 on module U8; AND circuits 62 and 64 on module U16; OR circuit 60 on module U10; NAND circuits 44 and 46 on module U22 and NAND circuits 48 and 50 on module U23.

Combinatorial logical operations performed by circuit 36 under control of $\overline{CLK}$, mode 1 and mode 2 information, are used to determine which ones of the currents I1, I2, I3 and I4 should be selected for generating the reference signal Vref by being applied to R70, C25 network, and when. The current selection is made according to the following table:

| MODE OF OPERATION | LOGIC MODE 1 | MODE 2 | CLK | I SOURCES ON |
|---|---|---|---|---|
| RUN | 0 | 0 | 0 | I1 + I2 |
|  | 0 | 0 | 1 | I2 |
| DAMP | 0 | 1 | 0 | I1 + I2 + I3 |
|  | 0 | 1 | 1 | I4 |
| DETENT | 1 | 1 | 0 | I2 + I3 |
|  | 1 | 1 | 1 | None |
| SPARE | 1 | 0 | 0 | I2 |
|  | 1 | 0 | 1 | None |

The spare mode is in fact not used in the present system. The run mode is used during moves of the motor 4 (FIG. 2); while detent mode is used whenever power conservation is to be considered, with low motor 4 torque and current being required. Damp mode is used at the end of moves to reduce rotor mechanical oscillations and needs the reference signal waveform with higher slope than the run mode.

The following element values have been selected for implementing the circuits represented on FIGS. 2, 3, 4 and 7.

| DESIGNATION | DESCRIPTION | VALUE |
|---|---|---|
| C24 | Capacitor 35V 10% | 1 μF. |
| C25 | Capacitor 100V 5% | .068 μF. |
| D1, D2 | Diodes, Fast recovery | 3A, 100V. |
| D11–D15 | Diodes |  |
| VZ2 | Diode, Zener |  |
| Q3 | PNP Transistor or Darlington |  |
| Q4 | NPN Transistor or Darlington |  |
| R1 | Resistor, 1W 5% | 1.8KΩ |
| R5 | Resistor, ¼W 5% | 220Ω |
| R6 | Resistor, ¼W 5% | 510Ω |
| R7 | Resistor, ¼W 1% | .5Ω |
| R26 | Resistor, ¼W 5% | 3KΩ |
| R29 | Resistor, ¼W 5% | 200Ω |
| R54 | Resistor, .2W 1% | 10KΩ |
| R55 | Resistor, .2W 1% | 4.99KΩ |
| R56 | Resistor, ¼W 5% | 470Ω. |
| R57 | Resistor, .2W 1% | 4.99KΩ. |
| R58 | Potentiometer | 10KΩ |
| Resistor .2W 1% | 4.99KΩ. |  |
| R62 | Resistor, .2W 1% | 2.67KΩ. |
| R63 | Resistor, .2W 1% | 4.49KΩ. |
| R64 | Resistor, .2W 1% | 2.54KΩ. |
| R65 | Resistor, .2W 1% | 13.4KΩ. |
| R70 | Resistor, .2W 1%. | 301Ω. |
| U20 | Operational Amplifier μA741 | (Fairchild) |

While the invention has been particularly shown and described with reference to the preferred embodiments thereof, it will be understood by those skilled in the art that changes in form and details may be made therein without departing from the spirit and scope of the invention. For instance, in an environment where microprocessors become faster, more reliable and relatively less expensive every day, one may think of using program controlled logic systems for simulating the generation of the so called reference signal. Also, one may use the same damping process and system with different types of stepper motors, e.g., permanent magnet stepper motors and/or stepper motors with one pole per phase.

What is claimed is:

1. A method for dynamically controlling the damping of a stepper motor having motor phase windings on salient poles and also having means for controlling the application of currents to predetermined phase windings, said method including:
   generating a clock signal;
   generating a reference signal in predetermined phase and frequency relationship with said clock signal, said reference signal being at a maximum magnitude at a time proximate to said clock signal and decreasing continuously in magnitude at subsequent times until power to one of said predetermined phase windings is switched between ON and OFF;
   sensing the current including current flowing through said one of said predetermined phase windings but not including current flowing through phase winding for a pole next adjacent in operation to a pole of said one phase winding for deriving a sense signal thereof;
   comparing for equality in amplitude said reference signal with said sense signal for deriving an equality information thereof;
   switching the power applied to said one of said predetermined phase windings ON and OFF alternatively, using the information provided by said clock signal for switching one way and said quality information for switching the other way.

2. A method according to claim 1 wherein each of said motor phase windings consists of the windings of at least two salient poles.

3. A method according to claim 1 wherein said predetermined frequency relationship is a one to one relationship.

4. A method according to claim 1, 2 or 3 wherein said reference signal is a sawtooth shaped signal.

5. A method according to claim 1, 2 or 3 wherein said reference signal is shaped as a sawtooth having negative slopes decaying substantially exponentially.

6. A method according to claim 1 or 2 wherein said comparing for equality operation is performed over portions of reference signal and sense signal oppositely sloped.

7. A method according to claim 6 wherein the period of said clock signal is at least 40 times smaller than the time constant of said predetermined phase windings.

8. A system for dynamically controlling the damping of a stepper motor having one winding per phase or a set of windings connected together into a single phase winding for each of its phases, said system comprising:
- a power supply;
- a power stage for selectively connecting said sets of winding to said power supply;
- sensing means connected to said power stage for sensing phase currents and for deriving a sense signal thereof representative of the current of one phase;
- a clock signal generator for generating a clock signal;
- a voltage reference generator connected to said clock signal for generating a reference signal in predetermined frequency and phase relationship with said clock signal, said reference signal being at a maximum magnitude at a time proximate to said clock signal and decreasing continuously in magnitude at subsequent times until power to the winding of said one phase is switched between ON and OFF;
- a predrive control processing unit provided with:
  - comparing means for comparing said sense signal and said reference signal and for deriving an equality information thereof; and
  - switching means for switching the connection between said winding of said one phase and said power supply ON and OFF based on the information provided by said clock signal and said equality in amplitude information.

9. A system according to claim 8 also comprising separate sensing means as described for sensing current of the next adjacent phase in operation and switching means as described for switching power ON and OFF to said next adjacent phase.

10. A system according to claim 8 wherein said power stage includes a bridged type of configuration for feeding the motor phase windings.

11. A system according to claim 8 or 9 wherein said voltage reference generator generates a sawtooth shape reference signal.

12. A system according to claim 11 wherein said sawtooth shaped reference signal is in phase with said clock signal.

13. A system according to claim 12 wherein said sawtooth shaped reference signal is exponentially shaped.

14. A system according to claim 13 wherein said voltage reference generator includes:
- a resistance-capacitor network;
- at least one constant current source; and
- connecting means for connecting said constant current source(s) to said resistance-capacitor network.

15. A system according to claim 13 wherein said voltage reference generator includes:
- a resistance-capacitor network;
- at least two constant current sources; and
- logic circuit means for connecting at least one of said constant current sources to said resistance-capacitor network.

16. A system according to claim 15 wherein means are also provided for controlling said logic circuit for connecting several combinations of said constant current sources to said resistance-capacitor network according to predetermined combinatorial arrangements defined for different operating modes of the stepper motor.

17. A method for controlling the damping of a stepper motor having motor phase windings, power supply means and switching means for connecting only one of said motor phase windings to said power supply means, said method including:
- generating a clock signal;
- generating sense signals by sensing the currents flowing into only said one of said motor phase windings;
- using said clock signal for switching said switching means one way;
- generating a reference signal in phase with said clock signal, said reference signal being at a maximum magnitude at a time proximate to said clock signal and decreasing continuously in magnitude at subsequent times until said switching means is switched the other way;
- comparing for equality in amplitude said reference signal with said sense signal for generating an equality information therefrom;
- using said equality information for switching said switching means the other way.

18. A method according to claim 17 wherein said reference signal is a sawtooth.

19. A method according to claim 18 wherein said sawtooth is substantially exponentially shaped.

20. A method according to claim 17 wherein said clock signal has a period substantially smaller than the time constant of said motor phase windings.

* * * * *

UNITED STATES PATENT AND TRADEMARK OFFICE
CERTIFICATE OF CORRECTION

PATENT NO. : 4,319,174
DATED : March 9, 1982
INVENTOR(S) : Paul A. Cook et al

It is certified that error appears in the above-identified patent and that said Letters Patent are hereby corrected as shown below:

Col. 10   line 47   "quality" should read --equality--

Signed and Sealed this

Second Day of November 1982

[SEAL]

Attest:

GERALD J. MOSSINGHOFF

Attesting Officer      Commissioner of Patents and Trademarks